Dec. 2, 1952　　　　D. A. GUSTAFSON　　　　2,620,426
HIGH-TEMPERATURE ELECTRIC INSULATING CONSTRUCTION
Filed Sept. 3, 1949　　　　　　　　　　　　2 SHEETS—SHEET 1

INVENTOR.
DAVID ALFRED GUSTAFSON
BY
Oscar W Jiere

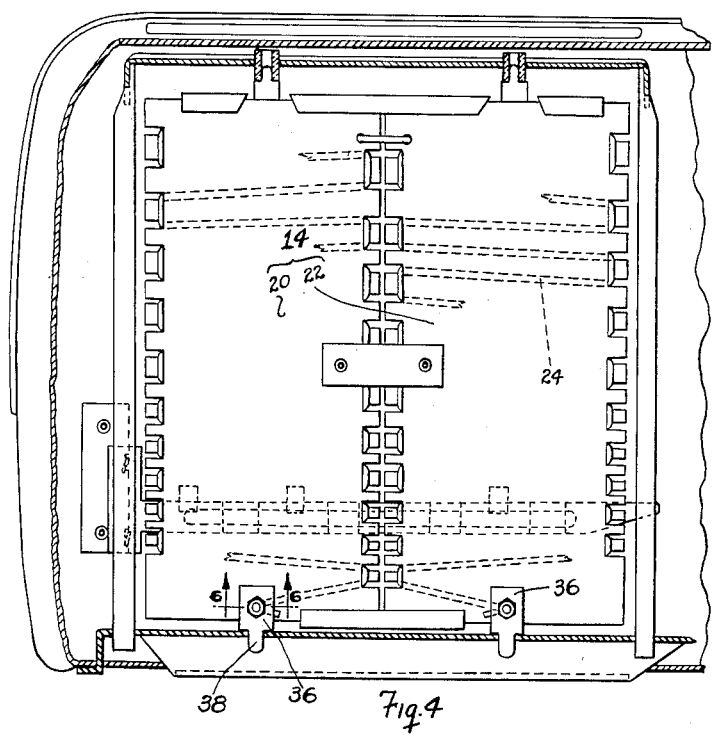
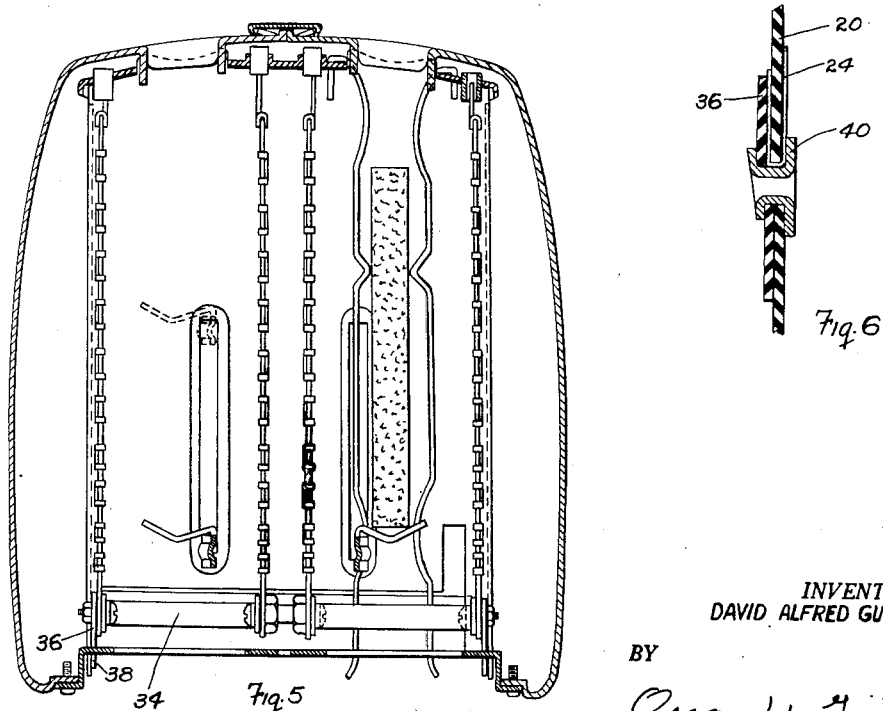

Patented Dec. 2, 1952

2,620,426

UNITED STATES PATENT OFFICE 2,620,426

HIGH-TEMPERATURE ELECTRIC INSULATING CONSTRUCTION

David A. Gustafson, Elgin, Ill., assignor to McGraw Electric Company, Elgin, Ill., a corporation of Delaware Application September 3, 1949, Serial No. 113,950

3 Claims. (Cl. 219—19)

1

The present invention relates to electric heating devices and more particularly to the insulation of the heaters in electric toasters and the like.

The insulating support for the conductors of the electric heating element for a toaster or the like must not only provide insulation between separate parts of the heating conductor but must also present such a high resistance to leakage current from the heating element to the case and to other accessible parts, that a person experiences neither danger nor any perceptible shock when touching it. Such a support must also maintain its insulating properties at high temperatures and after exposure to high humidity, must have good mechanical strength, and should be suitable for use in low-cost constructions.

There is as yet no material known to meet all these requirements, so that materials and constructions now in use are necessarily compromises. Because of this situation a relaxation of one requirement may permit improvement as to others. Accordingly, in practicing the present invention I take advantage of the fact that the temperature is not uniform in a toaster and provide insulators of different heat-resisting properties. In one form the insulating support of the present invention comprises an improved tubular insulating member held on an elongated tab on a heating element and lying loose within an aperture of a frame member. Used on an erect tab, it is normally held in place by the tab itself, but to prevent displacement when the appliance is inverted or otherwise handled, a stop such as a part of the casing, lies close to the upper end of the insulator.

Object of the present invention include the provision of a new and improved, low cost, low leakage, sturdy, high-temperature-resisting, insulating support for an electric heating element, the provision of an improved construction for an electrically heated device, and the provision of an improved electric toaster.

Other objects and advantages of the invention will appear from the following description of one specific embodiment which illustrates the manner in which the invention may be put into practice. In the drawings:

Figure 1 is a fragmentary perspective view, partly in section, showing a portion of the oven frame and electric heating elements of a toaster embodying the insulating construction of the present invention, and showing also a specific insulating support thereof;

2

Figure 1:
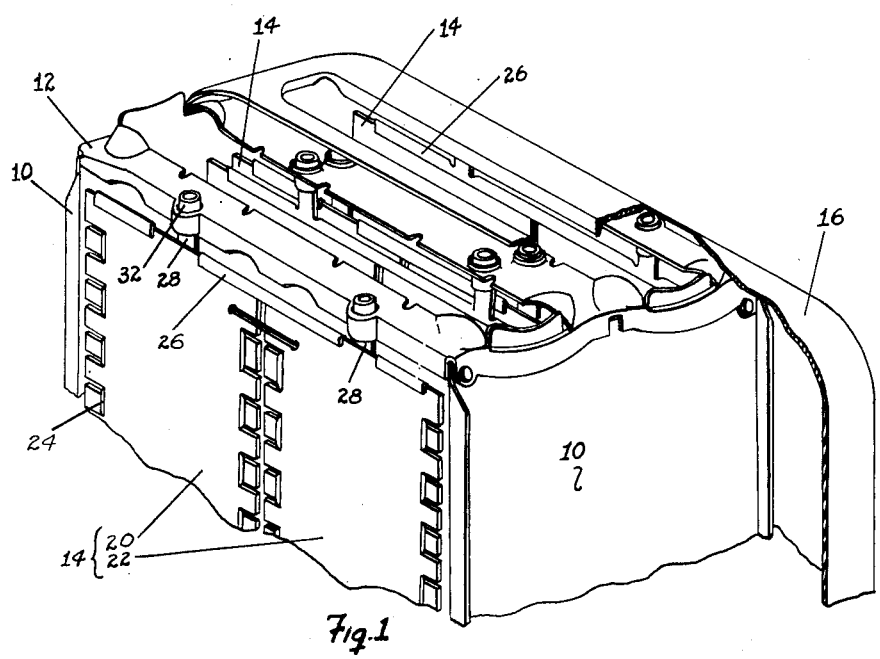

Figs. 4 and 5 are sectional elevations of the toaster of Fig. 1, Fig. 4 being taken substantially along the line 4—4 of Fig. 5, and Fig. 5 along the line 5—5 of Fig. 4; and, Fig. 6 is a detail of an insulating support taken at 6—6 in Fig. 4.

Figure 3:
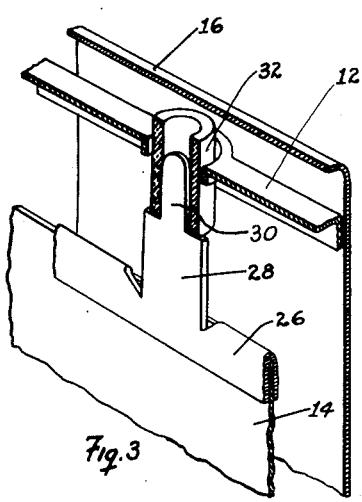
Fig. 3 is an enlarged, cut-away view in perspective showing a detail of the insulating support of Fig. 1.

The toaster of Fig. 1 includes oven end walls 10, a slotted oven top-frame 12, heating elements 14 supported therein, and a toaster casing 16. Each heating element 14 includes two mica sheets 20 and 22 on which a resistance conductor 24 is wound. A metal clip 26 joins the two sheets 20 and 22 at their upper edges and has a pair of tabs 28 extending up therefrom. As may be seen best in Fig. 3, each of these tabs 28 has a narrow tongue 30 at its uppermost end which extends into a short plain tube or collar of a refractory material having low electric leakage at high temperature, such as porcelain, which in turn lies loose within a hole in the oven top frame. The shoulder at the base of the tongue 30 supports the porcelain tube and the tube in turn gives lateral support to the heating element 14.

Figure 2:
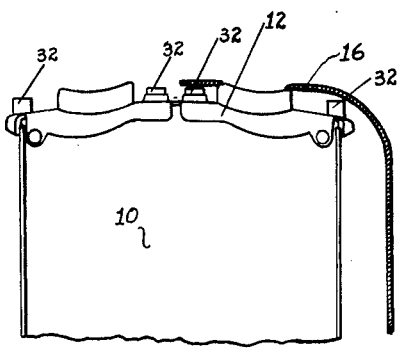
Fig. 2 is a sectional elevation of the part of a toaster that is shown in Fig. 1.

As is shown best in Fig. 2, the casing 16 of the toaster overlies the top frame 12 and the tubular insulators 32 are of such length that their tops lie just below the casing. Consequently the casing of the fully assembled toaster constitutes a stop for preventing the upward displacement of the insulator tubes 32.

As is shown in Figs. 4 and 5, the four heating elements 14 are joined at their lower edges by rigid bars 34 which also constitute the circuit connections thereto. This assembly is carried by four insulating members 36 fastened to the two outermost elements 14 by grommets 40 (Fig. 6) through which the bolts pass that hold bars 34. The members 36 are formed of laminated fiberglass fabric impregnated with a silicone resin, and are formed with tabs 38 that set in apertures in the toaster frame.

Primarily, a supporting structure for a heating element must permit electric operation of the device and survive the heat to which it is exposed. Further it should be rugged, expose persons to no undue hazards and be as low in cost as these performance requirements permit. Bonded mica, which has long been one of the most suitable of the known materials for the insulating sheets 20 and 22, does not always maintain enough insulation against leakage to the case. Because toasters are operated with a substantial self-induced draft, and also because heated air rises with or without a through-draft, the top of the toaster structure reaches substantially higher temperatures than does the bottom. Although the insulators 36, constructed of glass and silicone resin, provide far better insulation than any other material of which I know that will withstand equally high temperatures, it is not fully satisfactory for use at the top of the heating elements because there the temperature is so high that the material suffers a loss of mechanical strength. However, this material does withstand the temperatures attained at the bottom of the heating elements. Accordingly, I employ the glass and silicone insulators 36 at the bottom and the more refractory porcelain insulators 32 at the top. Thus, instead of employing similar insulators in all parts of the structure, I impose a heat-resisting requirement on each insulating member no more severe than is necessary for that particular member, and thereby am enabled to utilize a material of higher resistivity for at least some of the members. Such a construction provides both maximum strength and maximum insulation.

The porcelain insulators 32 are made in the form of open-ended tubes of uniform cross section. This form not only permits their manufacture at low cost but also permits the use of simple structures, and facilitates the assembly operations. The loose fit of the insulator 32 both on the tab 30 and in the aperture of the frame, further reduces the cost by avoiding the need for close dimensional tolerances. It also insures that the weak and brittle porcelain will not be subjected to any large mechanical stresses. Cost is further reduced, and the insulation improved, by keeping the porcelain tubes 32 as short as possible. The use of the casing as one of the stops for holding the insulating tubes in place facilitates the assembly and eliminates extra parts.

The present construction provides a simple and effective insulator construction for a high-temperature, heating element and one that is lower in cost than prior constructions having similar strength and insulating properties. And it effectively combines various materials for providing an improved and effective, low cost, high strength, low leakage construction for electric toasters and the like.

Certain structures disclosed herein are claimed in the co-pending application of Bror G. Olving, Ser. No. 114,019, filed September 3, 1949.

The present invention includes all modifications and variations that fall within the scope of the appended claims.

I claim:

1. In combination in an electric heating device, a heating element having an electric heating conductor, an elongated tab on said heating element, said tab having a narrow outer end portion and a wider portion next to said narrow portion with a shoulder therebetween, a tubular insulator of substantially uniform cross section encircling said narrow end portion and loose thereon, a frame member having an aperture in which said insulator lies loose, a removable casing enclosing said frame and heating element, a part of said casing constitutes a stop opposite the outer end of said insulator for retaining said tubular insulator on said tab and within said aperture.

2. In combination in an electric heating device, a heating element having an electric heating conductor, a supporting tab extending from said element, said tab having a narrow outer end portion, a tubular insulator formed of a refractory material having high electric resistance encircling said narrow end portion, a shoulder intermediate the end of said tab for preventing movement of said insulator inward relative to said tab, a frame member having an aperture in which said insulator lies loose, a stop member outward of said insulator and connected to said frame member for blocking outward movement of said insulator, and other support means for said heating element for preventing inward movement of said tab whereby said tab is retained between said shoulder and stop member for supporting said heating element on said frame and insulating it therefrom.

3. In an electric toaster construction, in combination, a case having an exposed conducting surface, a resistance heating conductor therein, and insulating means for supporting said conductor in said case including a vertical sheet of mica or the like which may become too conducting at operating temperatures to provide the desired insulation against shock, insulating support members for said mica sheet near the bottom thereof formed of a silicone laminate of fiberglass, and insulating supports near the top thereof formed of porcelain.

DAVID A. GUSTAFSON.

REFERENCES CITED

The following references are of record in the file of this patent:

UNITED STATES PATENTS

| Number | Name | Date |
|---|---|---|
| 950,058 | Shailor | Feb. 22, 1910 |
| 1,108,554 | Copeman | Aug. 25, 1914 |
| 1,466,656 | Barr et al. | Sept. 4, 1923 |
| 1,753,601 | Eaton | Apr. 8, 1930 |
| 1,900,249 | Miller et al. | Mar. 7, 1933 |
| 1,916,066 | Moyle | June 27, 1933 |
| 1,926,276 | Forbes | Sept. 12, 1933 |
| 1,997,146 | Hynes | Apr. 9, 1935 |
| 2,049,717 | Pavelka | Aug. 4, 1936 |
| 2,133,183 | Baird et al. | Oct. 11, 1938 |
| 2,171,897 | Sardeson | Sept. 5, 1939 |
| 2,419,355 | Koci | Apr. 22, 1947 |

FOREIGN PATENTS

| Number | Country | Date |
|---|---|---|
| 614,587 | Great Britain | Dec. 17, 1948 |